United States Patent [19]
Hoizumi et al.

[11] Patent Number: 5,737,911
[45] Date of Patent: Apr. 14, 1998

[54] METHOD OF OPERATING COMBINED PLANT

[75] Inventors: Shinichi Hoizumi; Hideyuki Sato; Satoshi Kusaka; Youichi Hattori, all of Hitachi; Hitoshi Ishimaru, Takahagi, all of Japan

[73] Assignees: Hitachi, Ltd., Tokyo; Hitachi Engineering Co., Ltd., Ibaraki, both of Japan

[21] Appl. No.: 583,753

[22] Filed: Jan. 17, 1996

[30] Foreign Application Priority Data

Jan. 20, 1995 [JP] Japan ..................... 7-006929

[51] Int. Cl.$^6$ ..................... F02C 6/18
[52] U.S. Cl. ..................... 60/39.02; 60/39.15; 60/39.182
[58] Field of Search ..................... 60/39.02, 39.141, 60/39.15, 39.182

[56] References Cited

U.S. PATENT DOCUMENTS

| 3,494,126 | 2/1970 | Foster-Pegg | 60/39.15 |
| 3,500,642 | 3/1970 | Foster-Pegg | 60/39.15 |

FOREIGN PATENT DOCUMENTS

| 135940 | 6/1986 | Japan | 60/39.182 |
| 63-247529 | 10/1988 | Japan . | |

*Primary Examiner*—Louis J. Casaregola
*Attorney, Agent, or Firm*—Fay, Sharpe, Beall, Fagan, Minnich & McKee

[57] ABSTRACT

An operating method of a combined plant that has several gas turbines and exhaust heat recovery boilers which generate steam by exhaust gas from the gas turbines wherein exhaust gas from each of the heat recovery boilers is passed through exhaust gas ducts and discharged from a common chimney. The method includes operating a combined plant having plural axes which may be suitably started or stopped and having means for discharging exhaust gas from three or more gas turbines through one common chimney. When the pressure at a joining part of an exit duct of an exhaust heat recovery boiler is a positive pressure or the atmospheric temperature is higher than a preset atmospheric temperature, gas turbines can be re-started or stopped without back-flow of exhaust gas of the gas turbine.

3 Claims, 6 Drawing Sheets

EXHAUST GAS

METHOD OF OPERATING COMBINED PLANT

BACKGROUND OF THE INVENTION

1. Field of the Invention

This invention is related to an operating method of a combined plant comprising gas turbines, exhaust heat recovery boilers and exhaust ducts, with the exhaust ducts being connected to a single common chimney.

2. Description of the Prior Art

As prior art, there is disclosed in Japanese Laid-open Print No. 63-247529, a combined plant of multiple axes type, where each of the units is composed of a gas turbine and an exhaust heat recovery boiler which generates steam by exhaust gas from the gas turbine, wherein the exhaust gas from each of the exhaust heat recovery boilers is discharged from a common chimney through an exhaust duct. But, there is not disclosed in the prior art a combined plant having three axes or more. In a combined plant on which a plurality of gas turbines are mounted, there is not a disclosure that when one of the gas turbines is stopped and other gas turbines are driving, the stopped gas turbine is started or one of the gas turbines being operated is stopped.

SUMMARY OF THE INVENTION

An object of the present invention is to provide an operating method of appropriately starting or stopping one or more of selected gas turbines in a combined plant of plural axes type.

In the method of operating the combined plant used in the present invention, the combined plant has several gas turbines and exhaust heat recovery boilers that generate steam by exhaust gas from the gas turbines, and the exhaust gas from each of the heat recovery boilers is discharged from the common chimney through exhaust gas ducts.

Each of the gas turbines used in the present invention has a compressor that compresses air taken from atmosphere, a combustor that burns fuel with air supplied from the compressor in order to obtain combustion gas and a turbine that is driven by combustion gas.

The air quantity taken in the compressor is controlled by an opening degree of an inlet guide vane (hereinafter referred to as IGV) of the compressor. The opening degree is controlled according to a load of the gas turbine, for example. Each of the exhaust heat recovery boilers used in the present invention generates steam by exhaust gas from the gas turbine. Each exhaust heat recovery boiler is provided with a denitration equipment, which eliminates nitrogen oxide (NOx) in the exhaust gas. The exhaust gas from the exhaust heat recovery boiler is discharged into the atmosphere from the chimney through the exhaust gas duct.

The combined plant used in the present invention has steam turbines, and these steam turbines are driven by steam that is generated in the exhaust heat recovery boilers. There are two cases related to this combined plant used in the present invention, one of which is a case where a dynamo, a steam turbine, a gas turbine and a exhaust heat recovery boiler are connected in this order to form one axis, and the other is a case where a dynamo, a gas turbine and a exhaust heat recovery boiler are connected to form one axis and a dynamo and a steam turbine are connected to another axis. The combined plant used in the present invention should preferably be an axial-flow exhaust in which exhaust gas from the gas turbine is discharged in the axial direction of the gas turbine and the exhaust heat recovery boiler, and air is supplied from the lower part of the gas turbine in this axial direction.

The combined plant used in the present invention has a plurality of axes each of which comprises at least a gas turbine and a exhaust heat recovery boiler, wherein:

(1) In the case where one gas turbine in a plurality of gas turbines stops and other gas turbines are driving, the gas turbine being stopped is started, and (2) One gas turbine is stopped during operation of a plurality of gas turbines.

In the method of operating the combined plant of the present invention, an exhaust gas partition device is opened and an exhaust gas system is purged. Next, the gas turbine is started to increase the number of revolutions, and a load is taken out from the gas turbine. The steam temperature from the exhaust heat recovery boiler is increased to take out a load from the steam turbine. Then, the loads taken out from the gas turbine and the steam turbine are increased.

Features of the method of operating the combined plant of the present invention are as follows. In case of (1) above; a load of a gas turbine being operated is restricted so that an exhaust gas pressure in the vicinity of the place, where plural exhaust ducts gather, becomes atmospheric pressure (gauge) or less than atmospheric pressure (gauge) (i.e. 0—10 mmAq), and then the stopped gas turbine is started again. In case of (2) above; a load of a gas turbine not being stopped is restricted so that an exhaust gas pressure in the vicinity of the place, where plural exhaust ducts gather, becomes atmospheric pressure or less (i.e. 0—10 mmAq), and then the gas turbine is stopped later.

In the case where the load of the gas turbine is restricted, it is better to decrease the quantity of fuel supplied to the gas turbine. The neighborhood of the place where a plurality of exhaust gas ducts are gathered is an area (point) between the chimney and the exhaust gas partition devices installed to the exhaust gas ducts connecting with the exhaust heat recovery boilers and the chimney. The pressure of the exhaust gas should preferably be measured at the vicinity of backwash side of the exhaust gas partition devices.

Another features of the operating method of the combined plant used in the present invention are as follows. In case of (1) above; when the measured atmospheric temperature is more than the preset temperature, a load of the gas turbine on driving is restricted, and the stopped gas turbine starts later. In case of (2) above; when the measured atmospheric temperature is more than the preset temperature, a load of the gas turbine not being stopped is restricted, and then the gas turbine on driving is stopped. The above result is also achieved by controlling the opening degree of the IGV of the compressor on the basis of the measured exhaust gas pressure and the atmospheric temperature.

The combined plant used in the present invention comprises several gas turbines and exhaust heat recovery boilers that generate steam by exhaust gas from the gas turbines, and the exhaust gas from each of the exhaust heat recovery boilers is discharged from a common chimney through each of the exhaust gas ducts, and it has means for measuring the pressure of the exhaust gas in the vicinity of the place where a plurality of exhaust gas ducts are gathered. The combined plant used in the present invention has means for measuring the atmospheric temperature and for controlling the loads of the gas turbines in otherwise driving when the gas turbines are started or stopped on the basis of the measured atmospheric temperature. That is, in the present invention, when one of several axes is started or stopped (other axes are in operation), the pressure of the exhaust gas and the atmospheric temperature are measured and these are used as a parameter to control other axes being operated.

The combined plant used in the present invention preferably has three or four axes, each of which comprises a gas turbine and an exhaust heat recovery boiler that generates steam by the exhaust gas from this gas turbine. The exhaust gas from each of the exhaust heat recovery boilers is discharged from the common chimney of 200 m high or less (180 to 120 m high, particularly 150 m high or less is desirable) through the exhaust gas ducts. In another case of this invention, the combined plant has three of four axes, each of which is composed of a gas turbine, an exhaust heat recovery boiler that generates steam by exhaust gas from the gas turbine and a steam turbine that is driven by steam from the exhaust heat recovery boiler, which are connected in series. The exhaust gas from each of the exhaust heat recovery boilers is discharged from the common chimney of 120 to 180 m high through the exhaust gas ducts.

In the case where a stopped gas turbine is started, it is better to open the exhaust gas partition devices provided in the middle of the exhaust gas ducts, after controlling the load of other gas turbines that are being operated to a specific preset value. It is desirable that the pressure of the exhaust gas becomes at least atmospheric pressure or less at one place in the exhaust gas ducts provided with the exhaust heat recovery boilers connected to the gas turbines which are going to start or stop and the chimney, and means of measuring the pressure of exhaust gas should be provided at least one place in the exhaust gas ducts. In the case where the measured atmospheric temperature is used as a control parameter and when the measured atmospheric temperature is higher than the preset temperature, the load of the gas turbine or the opening degree of IGV of the compressor is restricted.

It is desirable that the load of the gas turbines during operation continuously, except the gas turbines that are about to start or stop, are decreased to a value lower than the preset load or the opening degree of the IGV of the compressor is decreased to a value lower than the preset value in response to the measured atmospheric temperature. In the case where two stopped gas turbines of four gas turbines are started or two gas turbines being operated in four are stopped, the two gas turbines should preferably be started or stopped together. A releasing device for exhaust gas is installed in the exhaust gas partition device that is provided at the middle of the exhaust gas duct. In the releasing device for the exhaust gas, while the exhaust gas partition devices are closed, it is better to open the partition valves or partition dampers that are provided with this exhaust gas-releasing devices so as to discharge the exhaust gas from the exhaust-gas partition devices to the outside.

In a power station having the combined plant with a plurality of gas turbines and exhaust heat recovery boilers, when a stopped gas turbine is started or a gas turbine during a certain operation is stopped, it is necessary to prevent the back-flow of high-temperature gas in the process of operation of the start or stop from the exhaust heat recovery boilers to the gas turbines. In this case, respective chimneys are provided to the gas turbines and the exhaust heat recovery boilers that are connected to the gas turbines. Or, one common chimney is installed to the gas turbines and the exhaust heat recovery boilers, and the pressure of the exhaust gas ducts of the common part where a plurality of exhaust gas ducts are joined or the pressure of the joining point with the chimney and the exhaust gas ducts, which lead the exhaust gas from the gas turbine that is going to start or stop, is made atmospheric pressure or less. As a result, the back-flow of the high-temperature gas from the side of the exhaust heat recovery boiler to the starting or stopping gas turbine can be prevented.

According to the present invention, in the combined plant having a plurality of the gas turbines and the exhaust heat recovery boilers, it is not necessary to install respective chimneys to all of the gas turbines and the exhaust heat recovery boilers. When two or three gas turbines are connected to a common chimney having a height of about 200 m that provides sufficient ventilation power, the pressure of the exhaust gas at the specified position can be made zero atg. or less and the exhaust gas at high-temperature does not flow backward in starting or stopping of the gas turbines. In the case where a power plant having a large capacity combined plant is constructed, because the number of the gas turbines and the exhaust heat recovery boilers are also increased, it was thought that the number of chimneys also should be increased inevitably according to the number of gas turbines and the exhaust heat recovery boilers. But, the increase of the number of the chimneys leads to a rise of a plant construction cost, and in case of constructing the power plant in the suburb of a city, it is not desirable from the viewpoint of scenery either. The fewer the number of chimneys, the better. The height of the chimney also should be lowered from the view points of construction cost and scenery. The present invention also fulfills such demands as ventilation power of the chimney.

Future power plants having combined plants are needed to take consideration sufficiently from the view point of a reduction of the construction cost and scenery more and more. For example, as for the chimney, there is a necessity for discharging the exhaust gas from four or more gas turbines (exhaust heat recovery boilers) through one chimney. The height of a chimney is also 200 m or less, if possible, and more specifically the height of the chimney should be about 100 to 150 m. In this case, when a certain stopped gas turbine is going to start and several other gas turbines are being driven, for example, there is a possibility that the pressure of the exhaust gas ducts, which leads the exhaust gas from the gas turbine (i.e. exhaust heat recovery boilers) to be started becomes zero atg. or more. Therefore, when the partition dampers, installed to the exit side of the exhaust heat recovery boilers are opened before the gas turbine starts, the exhaust gas flows backward to the gas turbine side (i.e. exhaust heat recovery boilers) that is going to start. Especially, in case of restarting after a stop for 8 hours, it is feared that the high-temperature gas at 200° to 300° C. remaining in the gas turbines and the exhaust heat recovery boilers flows into the air-intake room side through the compressor of the gas turbine. However, as the permissible temperature of an air filter installed in the air-intake room of the gas turbine and the air-intake room is considerably lower than the temperature of flowing backward exhaust gas at 50° to 150° C., there is a possibility that thermal deformation of the air-intake room and a burning of the air filter etc. are caused. In case a certain gas turbine is being stopped, by closing the exhaust gas partition device installed at the middle of the exhaust gas duct at the exit side of the exhaust heat recovery boiler, the exhaust gas is prevented from flowing backward. But, this exhaust gas partition device cannot cut off gas perfectly from the viewpoint of the structure, and a little amount of gas leak is inevitable. When the pressure of exhaust gas is atmospheric pressure or more, it is not possible to avoid exhaust gas flows backward to the gas turbine side (exhaust heat recovery boiler) during being stopped.

The present invention solves such problems as the construction cost, scenery and flowing backward of the exhaust gas. In order to solve these problems in the present invention, when the gas turbine which is stopped is going to re-start, the pressure at the joining point between the chimney and the exhaust gas duct or the exhaust gas duct at the exit side of the gas turbine (exhaust heat recovery boiler) becomes atmospheric pressure or more, the pressure should be reduced to atmospheric pressure or less. To prevent back-flow of exhaust gas leaking into the gas turbines in a stop from the exhaust gas partition devices, means for discharging the exhaust gas, which is leaked from the exhaust gas partition devices in a stop, to the outside. In the case where the pressure of the exhaust gas in the specified area (point) is zero atg. or less, the exhaust gas partition devices, which are installed in the exhaust gas ducts on the exit side of the exhaust heat recovery boilers to be started, are operated from the closed state to the open state, because the exhaust gas flows to the joining point side from the exhaust heat recovery boiler side, and the exhaust gas does not flow backward to the gas turbine side (exhaust heat recovery boiler) that is to be started. By installing equipment that discharges the leak of exhaust gas in the exhaust gas partition devices in the closed state that are provided to the exhaust gas ducts on the side of the exits of the exhaust heat recovery boilers in a stop to the outside, the exhaust gas can be prevented from flowing backward in the gas turbine (exhaust heat recovery boiler) in a stopped state.

A start or a stop at every axis is necessary for the following reasons.

(1) In accordance with a command on the quantity of electric power supply from the central power supply command room, a gas turbine is started or stopped.

(2) While a worker enters in the plant at the time of maintenance such as a periodic inspection and so on, the safety of work in that case is secured.

In addition, as for future plants, there is a tendency that the output power increases more and more and that a necessary volume of air also increases. Therefore, while there is a possibility that the pressure of exhaust gas becomes positive, a suitable plant operation is realized by employing the present invention. The present invention also shortens the distance from the chimney to the joining point.

BRIEF DESCRIPTION OF THE DRAWING

FIG. 3b. shows a sectional view along the line A—A' of FIG. 3a.

DETAILED DESCRIPTION OF PREFERRED EMBODIMENTS

Figure 4:
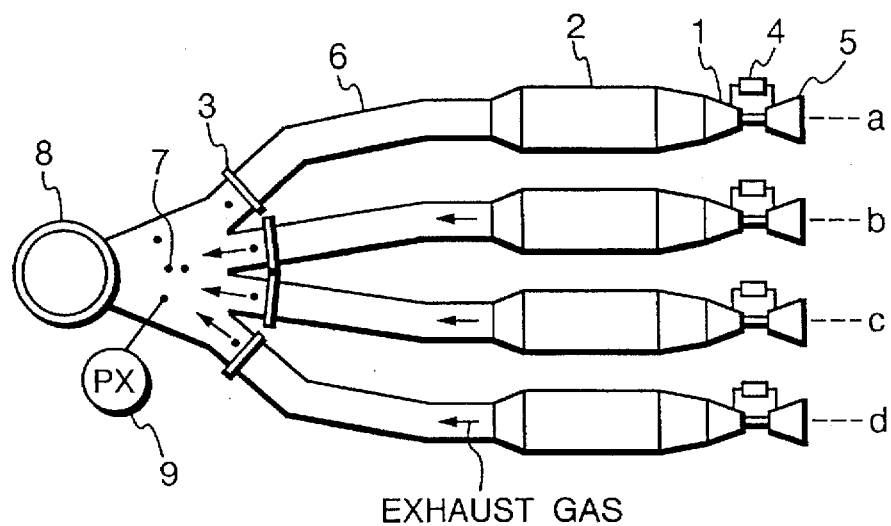
FIG. 4 illustrates a diagram of a four axes combined plant of one drum type.

FIG. 4 illustrates a plant structure in which a combined plant is composed of a plurality of gas turbines, a plurality of exhaust heat recovery boilers, each of which is connected to each of the gas turbines and one or more steam turbines which are driven by steam generated by the exhaust heat recovery boilers. Each of the exhaust ducts from each of the exhaust heat recovery boilers is connected with one common chimney. In the figure, the three units as b, c and d, each having a gas turbine 1 and an exhaust heat recovery boiler 2 are shown as operating or driving. When the stopped gas turbine 1 of unit a and exhaust heat recovery boiler 2 connected to gas turbine 1 are re-started, exhaust partition device 3, which is provided to the exit side of the duct 6 of exhaust heat recovery boiler 2, is opened before the gas turbine starts.

The pressure at joining point 7 on the exit duct of the exhaust heat recovery boilers in FIG. 4 can be expressed by formulae (i) to (iii).

$$P = \Delta P - PD \quad \text{(i)}$$

$$PD = (\gamma_a - \gamma_g) \cdot \Delta H \quad \text{(ii)}$$

$$\Delta P = \lambda \cdot l \cdot f(Q) \quad \text{(iii)}$$

Where,

P7 is a pressure at joining point 7 on the exit duct of the exhaust heat recovery boilers, $\Delta P$ is a pressure loss from joining point 7 on the exit duct of the exhaust heat recovery boilers to an exit of chimney 8, PD is a ventilation power by a chimney effect, $\gamma_a$ is the specific gravity of air at the exit of chimney 8, $\gamma_g$ is the specific gravity of exhaust gas, $\Delta H$ is a chimney height, Q is a quantity of flow, $\lambda$ is the friction coefficient of a duct, and I is a duct length.

From formulae (i), (ii) and (iii), it is proved that pressure P7 at above joining point 7 is influenced greatly by pressure loss $\Delta P$ from joining point 7 to the exit of chimney 8 which is dependent mainly on flow quantity Q, difference between specific gravity $\lambda_a$ air at the exit of chimney 8 and specific gravity $\lambda_g$ of the exhaust gas, and a ventilation effect PD (i.e. ventilation power) through chimney 8 depending on chimney height $\Delta H$. In the combined plant comprising gas turbines and the exhaust heat recovery boilers and the exhaust ducts on the exit side of the exhaust heat recovery boilers, the ducts being connected to one common chimney, pressure measurement means 9 is provided at the joining point on the exit duct of the exhaust heat recovery boilers. At this time, the turbines 1 of units b, c and d and all the exhaust heat recovery boilers 2 of these units that are connected to gas turbines 1 are being operated. Before starting unit a of the gas turbines 1 and exhaust heat recovery boilers 2, the pressure of exhaust gas at joining point 7 is necessary to be atmospheric pressure or less. Therefore, the gas pressure at joining point 7 is measured by pressure measurement means 9 provided at joining point 7, and when the pressure is atmospheric pressure or less, gas turbine 1 which is stopped, is re-started.

Figure 5:
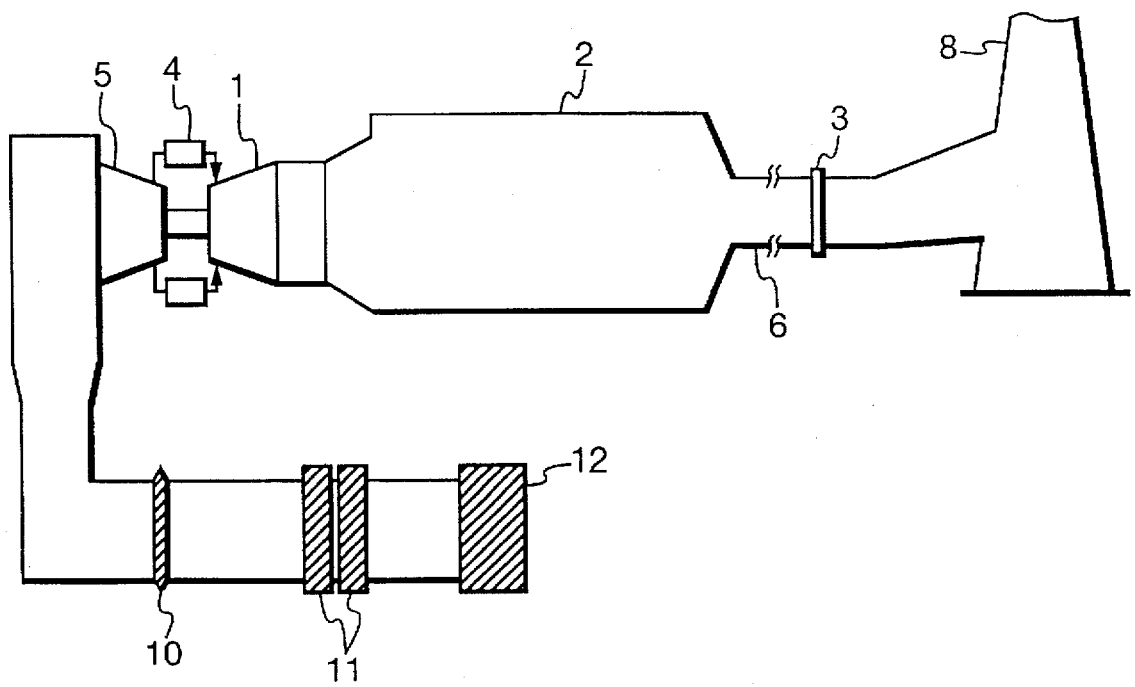
FIG. 5. shows a diagram of a side sectional view of the combined plant.

On the other hand, in the case where the gas pressure at joining point 7 is atmospheric pressure or more, when exhaust partition device 3 is opened, which is installed to the unit a in stopped gas turbine 1 and the exit side duct of the exhaust gas from exhaust heat recovery boiler 2, the exhaust gas flows backward in the direction of exhaust heat recovery boiler 2 which is to be re-started. Especially, when re-starting after a stop for 8 hours, the high-temperature exhaust gas at 200° to 300° C., that remains in exhaust heat recovery boilers 2 and gas turbines 1, flows into the air intake room via the compressor of gas turbine 1. As is shown in FIG. 5, because the permissible temperature of bellows 10 for a suctioning system, suction filter 11 and weather louver 12 installed to the side of the air intake room of the gas turbine are lower than the gas temperature at 50° to 150° C. that flows backward. Thus, there is a danger that causes troubles such as thermal deformation and burning down. When the gas pressure at joining point 7 is atmospheric pressure or more, an operating state where one or more of gas turbines b, c and d of gas turbines 1 being operated is changed until the gas pressure measured by pressure measurement means 9 at joining point 7 becomes atmospheric pressure or less. As is shown in formula (i), it is understood that the gas pressure at joining point 7 becomes lower, as the pressure loss from joining point 7 to the exit of chimney 8 becomes smaller. The smaller the exhaust gas that flows to the exit of chimney 8 from joining point 7, the lower the pressure loss becomes.

Figure 6:
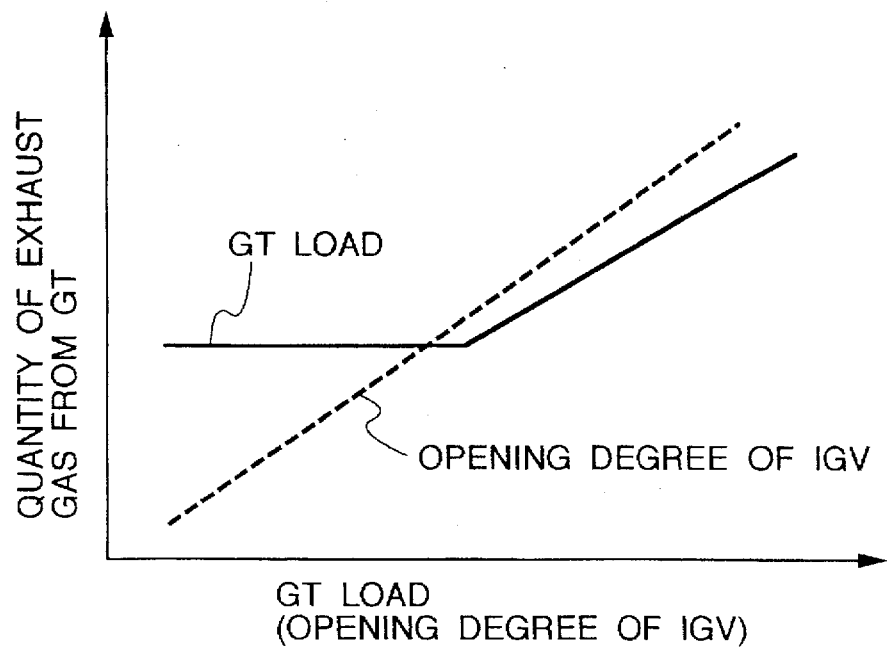
FIG. 6 is a characteristic graph that illustrates relationship between a gas turbine load and a quantity of exhaust gas of a gas turbine.

FIG. 6 shows a relationship between a gas turbine load and quantity of exhaust gas of a gas turbine, and it can be understood that the lower the load of the gas turbine is, the smaller the quantity of the exhaust gas is. Consequently, before starting the gas turbine from a stop by using this characteristic, the load of one or more of the gas turbines being operated is measured by pressure measurement means 9 installed at joining point 7, and by decreasing the gas pressure to atmospheric pressure or less, the pressure at joining point 7 is made atmospheric pressure or less. Thus, the gas turbine can be re-started without a back-flow of exhaust gas.

Figure 1:
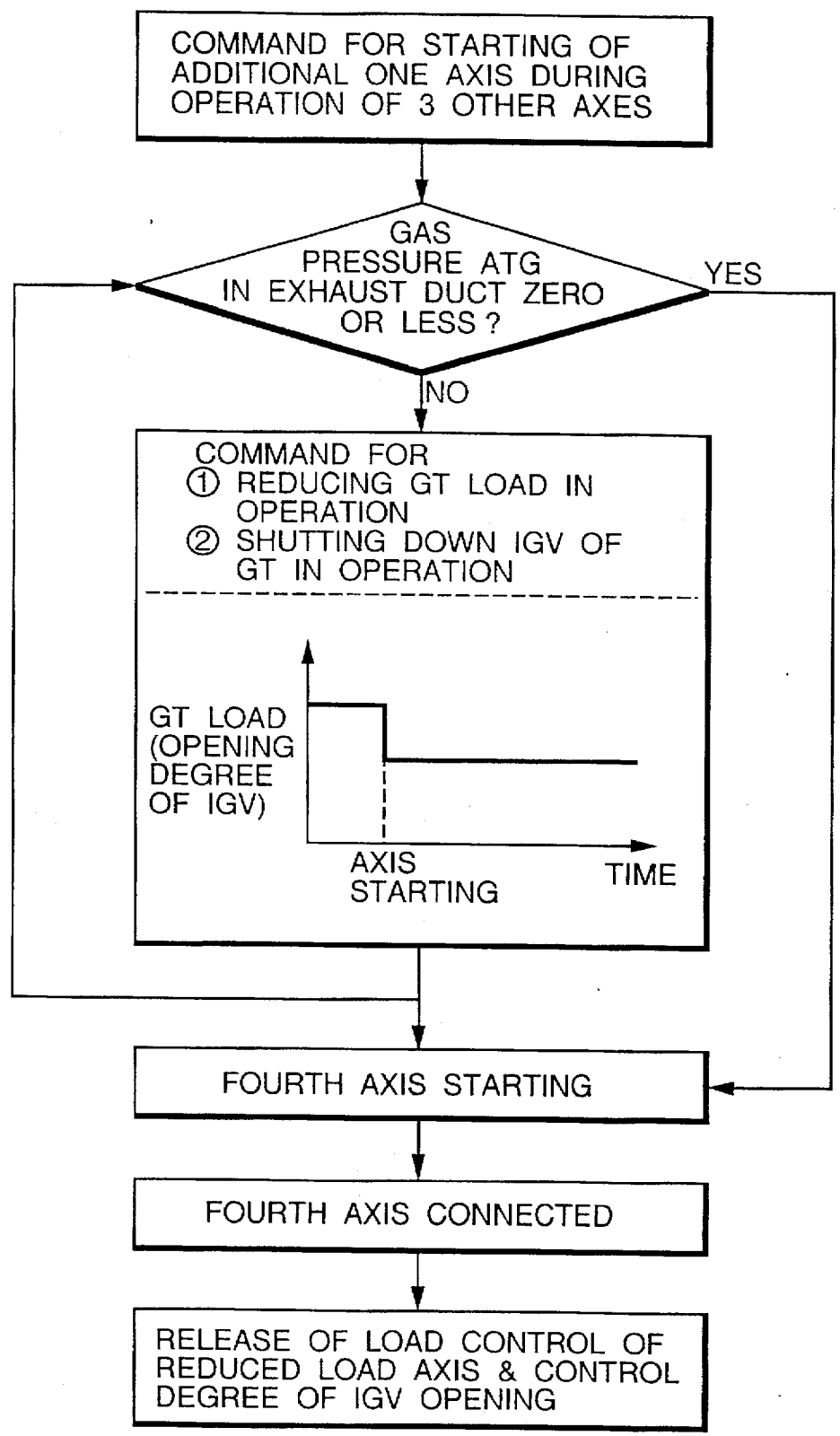
FIG. 1 illustrates a first flow diagram at the time of a start-stop of a gas turbine used in the present invention.

FIG. 1 shows a concrete example of a flow in case of starting a gas turbine from its stop. The gas pressure is measured by pressure measurement means 9 at any places installed at one or more places on gas turbines 1 to be started or on the way to the exit side duct of exhaust heat recovery boilers 2, instead of installing them at exhaust duct joining point 7.

FIG. 6. shows a relationship between an opening degree of IGV of the compressor of the gas turbine and a quantity of exhaust gas of the gas turbine, and it is proved that the smaller the opening degree of the IGV is, the lower the quantity of exhaust gas is. Therefore, the first object of the present invention is achieved by decreasing the opening degree of the IGV, instead of decreasing the load of the gas turbine on driving. FIG. 1 shows the concrete start flow in this case.

Figure 2:
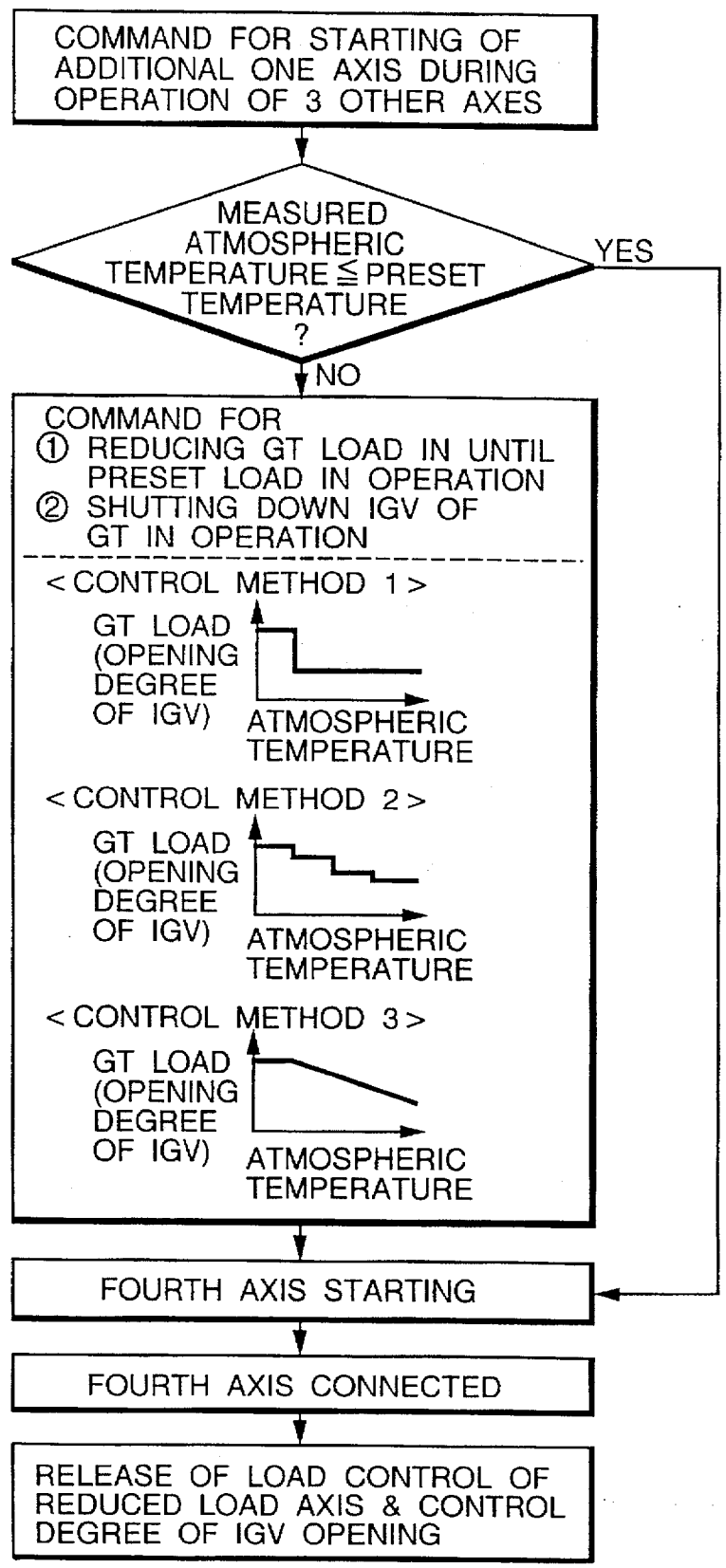
FIG. 2 illustrates a second flow diagram at the time of a start-stop of a gas turbine used in the present invention.

FIG. 2 shows another example of the present invention. In the combined plant comprising the plural gas turbines and the exhaust heat recovery boilers that are connected to each of the gas turbines, and the exhaust ducts at the exit sides of the exhaust heat recovery boilers are connected to one common chimney, when a gas turbine which is stopped is re-started, the residual load of the gas turbine being operated is adjusted in response to the atmospheric temperature measured by a measurement means. In this example, before starting the stopped gas turbine 1 of unit a exhaust heat recovery boiler 2 connected to gas turbine 1, the gas turbine which is stopped is started when an atmospheric temperature measured by a measurement means is lower than preset atmospheric temperature. If the measured atmospheric temperature is higher than the another preset atmospheric temperature, operation load of one or more of gas turbines of gas turbines 1 of the units b to d is set to the maximum value, and the operation load is made less than the maximum value. This principle is explained by formulae (i), (ii) and (iii). As is already explained, when a gas turbine is re-started, it is necessary to make a pressure of atmospheric pressure or less at the joining point between the exit side of gas ducts of the exhaust heat recovery boilers connected to the gas turbines and other common exhaust ducts or the common chimney. The above object is achieved by means for making the pressure of atmospheric pressure or less at the joining point, thereby to increase ventilation power PD of the chimney shown in formulae (i), (ii) and (iii). While the ventilation power PD of the chimney is proportional to $\gamma_a - \gamma_g$, i.e. the difference in the specific gravity between the air at the exit of chimney 8 and the exhaust gas, but the specific gravity is generally inverse to the gas temperature, it is proved that the ventilation power PD of the chimney is proportional to "Tg–Ta", i.e. the difference between the exhaust gas temperature and the atmospheric temperature at the exit of the chimney.

Figure 7:
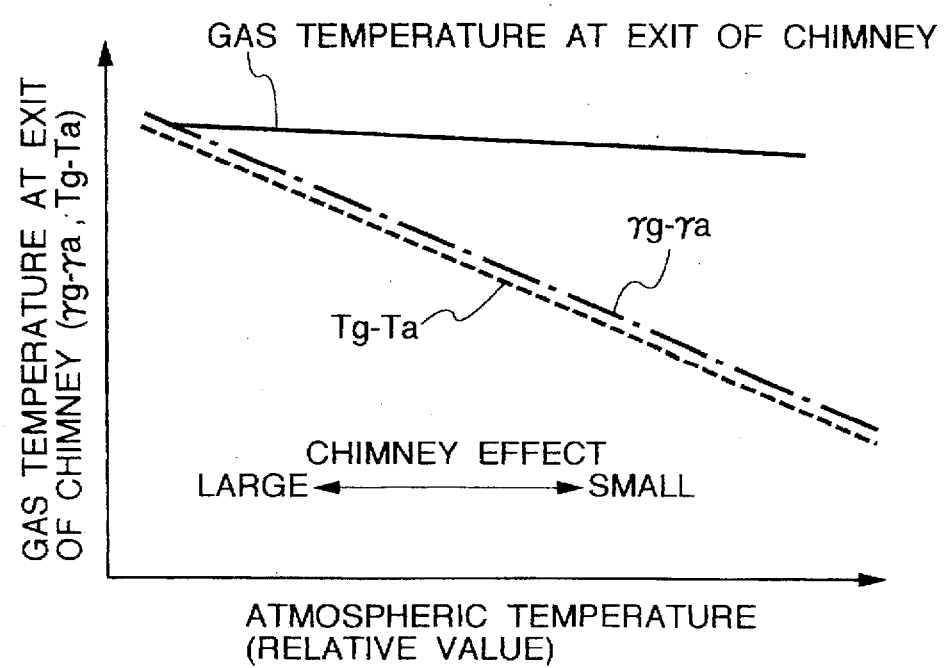
FIG. 7 illustrates a characteristic graph showing relationship between an atmospheric temperature and gas temperature at the exit of a chimney.

FIG. 7 shows the relationship between an atmospheric temperature and the temperature of exhaust gas at the exit of the chimney, wherein the temperature of exhaust gas does not change so much due to the atmospheric temperature. Therefore, as is shown in FIG. 7, the lower the atmospheric temperature, the larger the difference (Tg–Ta) i.e. between the gas temperature at the exit of chimney 8 and the atmospheric temperature becomes. The higher the atmospheric temperature is, the smaller the difference becomes. As shown in FIG. 7, the higher the atmospheric temperature is, the smaller the difference between specific gravity $\gamma_a$ of air at the exit of chimney 8 and specific gravity of exhaust gas $\gamma_g$ becomes. It is apparent from formula (ii) that ventilation power PD of the chimney becomes small. From the above fact, there is a possibility that the pressure of the joining point of the above exhaust gas duct becomes high as atmospheric pressure or more. In this example, when the measured atmospheric temperature is lower than another preset atmospheric temperature obtained by calculating the pressure at the joining point of the exhaust ducts that becomes atmospheric pressure or less, the gas turbine which is stopped is started without restricting the operation load of the gas turbines in operation. On the other hand, when the measured atmospheric temperature is higher than the preset atmospheric temperature calculated, the pressure of the joining point becomes atmospheric pressure or more. There is a danger that high-temperature gas will flow backward to the side of the gas turbine to be started. In order to make the pressure atmospheric pressure or less at the joining point of the above exhaust gas ducts, the operation load of one or a plurality of gas turbines 4 in operation is restricted so that the operation loads become lower than the value which was set in advance, and the stopped gas turbines are started. Of course, the same result will be obtained when the set value of the restricted load of the gas turbines being operated is made constant irrespective of the atmospheric temperature or is set at every atmospheric temperature.

FIG. 2. shows another start flow case. Instead of making the load of one or more of the gas turbines of units b, c and d in operation to be the load which becomes lower than the preset value, the object of the present invention is achieved by restricting the opening degree of IGV of the gas turbines to a value smaller than the preset degree. In the above starting method, when the pressure at the joining point between the exhaust ducts at the exit side of the exhaust heat recovery boilers connected to each of the gas turbines and the common exhaust duct or the chimney is atmospheric pressure or less, one or more gas turbines are started.

In the case where one or more of the gas turbines are driving and two or more gas turbines are stopped wherein the pressure at the above joining point is atmospheric pressure or less, high-temperature exhaust gas can be prevented from flowing backward to the gas turbines to be started by starting two or more gas turbines simultaneously, as a starting method of the stopped gas turbines. Of course, in case of starting these stopped gas turbines simultaneously, problems can be eliminated by the limitation of a starting device for starting the gas turbines, even if a timing of the start deviates a little.

Figure 3A:
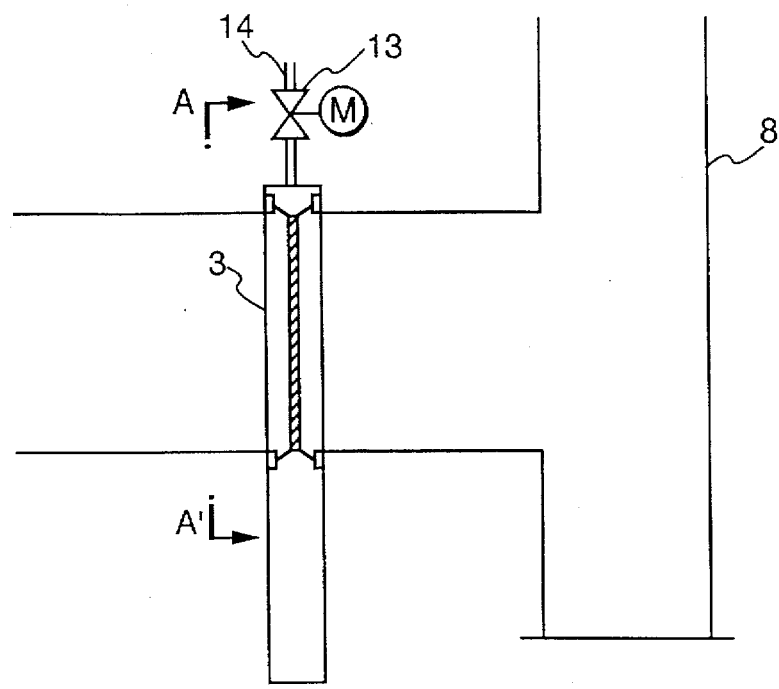
FIG. 3a. shows a vertical sectional view of a gas leak means used in the present invention.
Figure 3B:
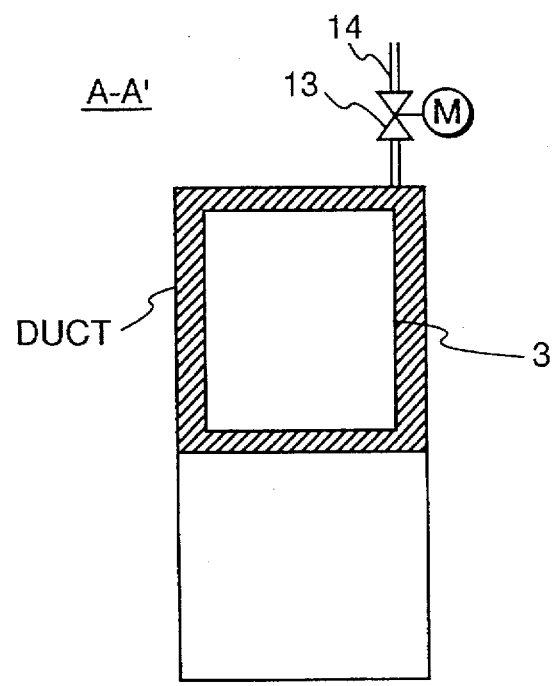

FIG. 3 shows another example of the present invention. While the above example is describing a method in case of starting gas turbines 1 which are stopped, this example provides a means of preventing exhaust gas from flowing backward to both gas turbines 1 and exhaust heat recovery boilers 2 which are stopped, wherein a certain gas turbine and exhaust heat recovery boiler are stopped and other gas turbines and exhaust heat recovery boilers are driving. As is shown in FIG. 4, in the combined plant composed of the gas turbines and the exhaust heat recovery boilers, exhaust gas partition devices 3 are generally installed in the exhaust gas ducts at the exit side of each of exhaust heat recovery boilers for the purpose of cutting off exhaust gas from the boilers. In the case where a certain gas turbine is being stopped, gas is prevented from flowing backward by closing partition devices 3 that are provided at the exit side of the ducts of the exhaust heat recovery boilers connecting to the gas turbines. Because of their structure, the partition devices 3 cannot perfectly prevent gas from leaking so that a little amount of gas leak is inevitable. When the pressure of exhaust gas at joining point 7 is zero atg. or more, a small amount of back-flow of exhaust gas to exhaust heat recovery boilers 2 which are stopped and to gas turbine 1 can not be avoided. In this case, there might be a problem that high-temperature gas flows backward to the above gas turbine suction room.

As is shown in FIG. 3, in this example, one or more of gas releasing devices 14 are installed to exhaust partition devices 3. While closing the exhaust gas partition devices, each of the valves or dampers 13 is opened, the valves or dampers being provided to the gas releasing devices thereby to discharge gas from the exhaust partition devices to the outside. By this, even if gas were leaked from gas partition devices 3 in the closed state, gas can be discharged to outside from releasing devices 14, and gas can be prevented from flowing backward to stopped exhaust heat recovery boiler 2 and to gas turbines 1. Because the quantity of the gas leak discharged from the gas releasing devices 14 to outside is small, no problem occurs in the plant. Of course, when exhaust partition devices 3 are open, the valves or dampers 13 provided to releasing devices 14 should be closed.

Figure 8A:
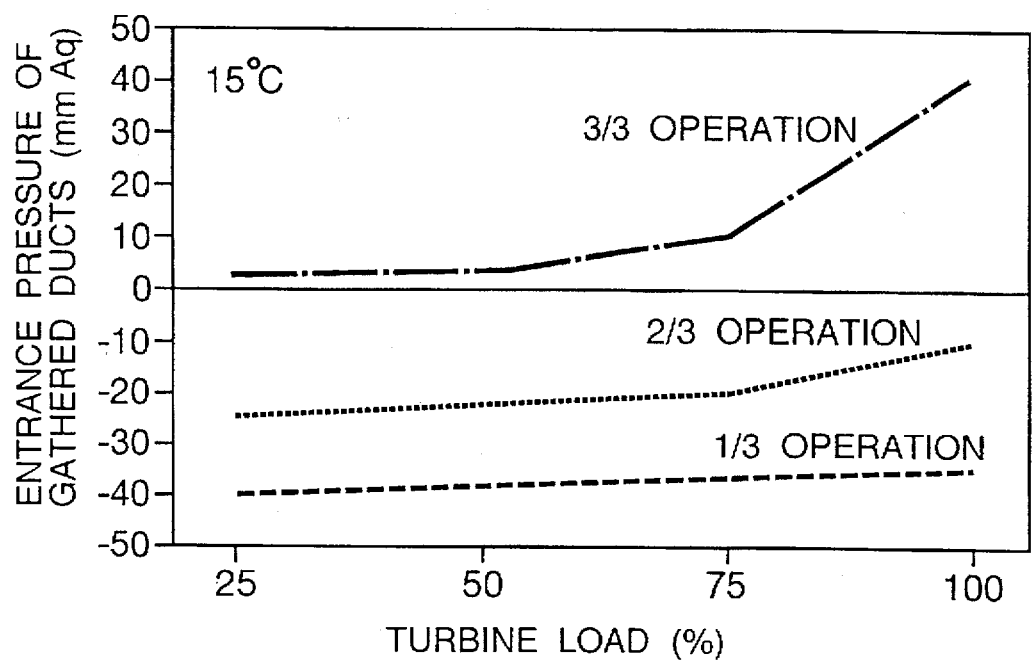
FIG. 8a and FIG. 8b are diagrams showing relationship between a turbine load and an entrance pressure of gathered ducts.
Figure 8B:
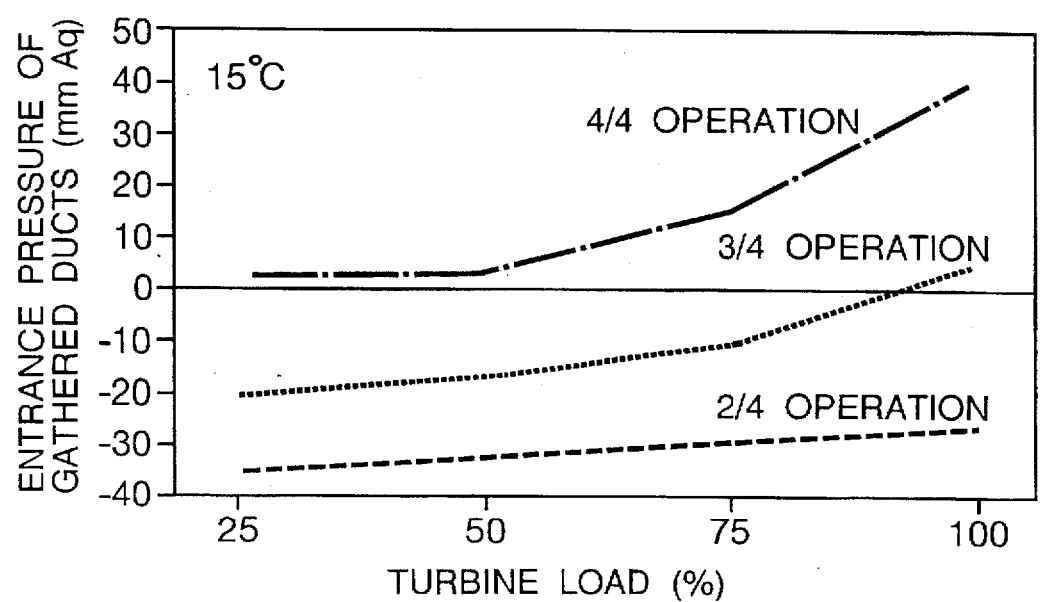

FIG. 8a and FIG. 8b are diagrams showing relationship between a turbine load and an entrance pressure of gathered ducts. FIG. 8a is the diagram related to the three axes combined plant, and FIG. 8b. is the diagram related to the four axes combined plant. While the atmospheric temperature for both the above cases is 15° C., the entrance pressure of the gathered ducts also rises as a turbine load rises. It is apparent that the entrance pressure of the gathered ducts sometimes becomes a positive pressure depending on the number of operation axes.

What is claimed is:

1. A method of operating a combined plant comprising a plurality of gas turbines, a plurality of exhaust heat recovery boilers that generate steam by exhaust gas from said gas turbines, exhaust gas ducts connected to each of said gas turbines, and a common chimney connected to said exhaust gas ducts, wherein said combined plant discharges said exhaust gas from each of said exhaust heat recovery boilers to said chimney through said exhaust gas ducts;

characterized in that when one of said gas turbines is stopped and others are being operated, a measured atmospheric temperature is more than a preset temperature, loads of said gas turbines being operated are restricted until the measured atmospheric temperature is less than the preset temperature, and then said stopped gas turbine is operated.

2. A method of operating a combined plant comprising a plurality of gas turbines, a plurality of exhaust heat recovery boilers that generate steam by exhaust gas from said gas turbines, exhaust gas ducts connected to each of said gas turbines, and a common chimney connected to said exhaust gas ducts, wherein said combined plant discharges said exhaust gas from each of said exhaust heat recovery boilers to said chimney through said exhaust gas ducts;

characterized in that when the gas turbines are being operated and a measured atmospheric temperature is more than a preset temperature, a load of at least one of said gas turbines being operated is restricted, and then other of said gas turbines being operated are stopped.

3. A method of operating a combined plant as claimed in claim 1;

characterized in that when more than one stopped gas turbine is started or more than one of the gas turbines being operated is stopped, two or more of said gas turbines are started or stopped at the same time.

* * * * *